(12) United States Patent
Brown et al.

(10) Patent No.: US 7,464,865 B2
(45) Date of Patent: Dec. 16, 2008

(54) SYSTEM AND METHOD FOR MANAGING MULTIPLE SMART CARD SESSIONS

(75) Inventors: Michael K. Brown, Kitchener (CA); Neil P. Adams, Waterloo (CA); Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 158 days.

(21) Appl. No.: 11/412,759

(22) Filed: Apr. 28, 2006

(65) Prior Publication Data

US 2007/0251997 A1 Nov. 1, 2007

(51) Int. Cl.
*G06K 5/00* (2006.01)

(52) U.S. Cl. ............... 235/380; 235/235; 235/492; 235/451

(58) Field of Classification Search ............ 235/380, 235/375, 492, 451, 487, 382, 472.02; 713/170–176, 713/155, 161
See application file for complete search history.

(56) References Cited

U.S. PATENT DOCUMENTS

| | | | |
|---|---|---|---|
| 5,227,613 A * | 7/1993 | Takagi et al. | 235/380 |
| 6,317,829 B1 * | 11/2001 | Van Oorschot | 713/155 |
| 2002/0197956 A1 * | 12/2002 | Annola et al. | 455/41 |
| 2005/0086479 A1 * | 4/2005 | Ondet et al. | 713/172 |
| 2006/0129639 A1 * | 6/2006 | Purdy et al. | 709/203 |

FOREIGN PATENT DOCUMENTS

| | | |
|---|---|---|
| EP | 1049306 A | 11/2000 |
| EP | 1635508 A | 3/2006 |
| EP | 1605627 A | 12/2006 |

OTHER PUBLICATIONS

R. Maier: "Authentication and paring in limited mobile environments". INET, [Online] Mar. 17, 2004, XP002396358, URL: http://www.esat.kuleuven.ac.be/cosic/seminars/slides/seminar-2004-03-17.pdf> [retrieved on Aug. 24, 2006], pp. 2-11.
Research In Motion Limited: "BlackBerry Smart Card Reader Security", Release 1.0, White Paper, 2005, p. 1-16.

\* cited by examiner

*Primary Examiner*—Edwyn Labaze
(74) *Attorney, Agent, or Firm*—Dimock Stratton LLP (firm); Jenna L. Wilson

(57) ABSTRACT

A system and method is provided for managing multiple smart card sessions with multiple communications or computing devices in association with a single smart card reader. A wireless smart card reader is provided for communicating with a plurality of devices requiring smart card functionality in a number of smart card sessions, in which each smart card session is addressed with an identifier identifying a single device. The smart card session is secured by a wireless connection pairing and by a secure pairing, such that each connection between the smart card reader and a device is secured against all other devices in communication with the smart card reader using a master connection key, which is unique for each device.

36 Claims, 4 Drawing Sheets

SYSTEM AND METHOD FOR MANAGING MULTIPLE SMART CARD SESSIONS

TECHNICAL FIELD

The present invention relates generally to smart card readers, and in particular to the handling of multiple devices requiring smart card access over a wireless communication link with a smart card reader.

TECHNICAL BACKGROUND

Smart cards, also referred to as chip cards or integrated circuit cards, are devices with an embedded integrated circuit (such as a microprocessor and/or memory) for use as storage of sensitive data or user authentication. Smart cards may comprise memory for storing financial or personal data, or private data such as private keys used in the S/MIME (Secured Multipurpose Internet Mail Extensions) encryption technique. Preferably, some of this data may be secured using a PIN (personal identification number) or a password as an access control measure. In order to access the protected data stored in the card's memory, a user must be validated by providing the correct PIN or password.

Typically, the smart card does not include a data entry device for direct entry of a PIN or password for the purpose of user authentication, and instead the smart card is used in conjunction with a smart card reader that is in communication with an input device. When the smart card is in communication with the smart card reader, a PIN or password may be provided by the user via the input device to the smart card reader. The reader may then pass the user-entered PIN or password on to the smart card for verification, so that the smart card can authenticate the user.

However, smart card readers typically rely on a dedicated connection with the connecting device, such as a Universal Serial Bus (USB) connection between the mobile device or personal computer and the smart card reader, or a wireless communication link between the smart card reader and a single connecting device. Therefore, the smart card reader is effectively dedicated for use with a first computing and/or communications device, and cannot be used in conjunction with a further mobile device or other communications or computing device without first severing the connection between the first device and the smart card reader.

It is therefore desirable to provide a system and method by which a smart card reader may be used with multiple computing devices, including mobile communication devices and other computing devices such as personal computers.

BRIEF DESCRIPTION OF THE DRAWINGS

In drawings which illustrate by way of example only a preferred embodiment of the invention.

DETAILED DESCRIPTION

Figure 1:
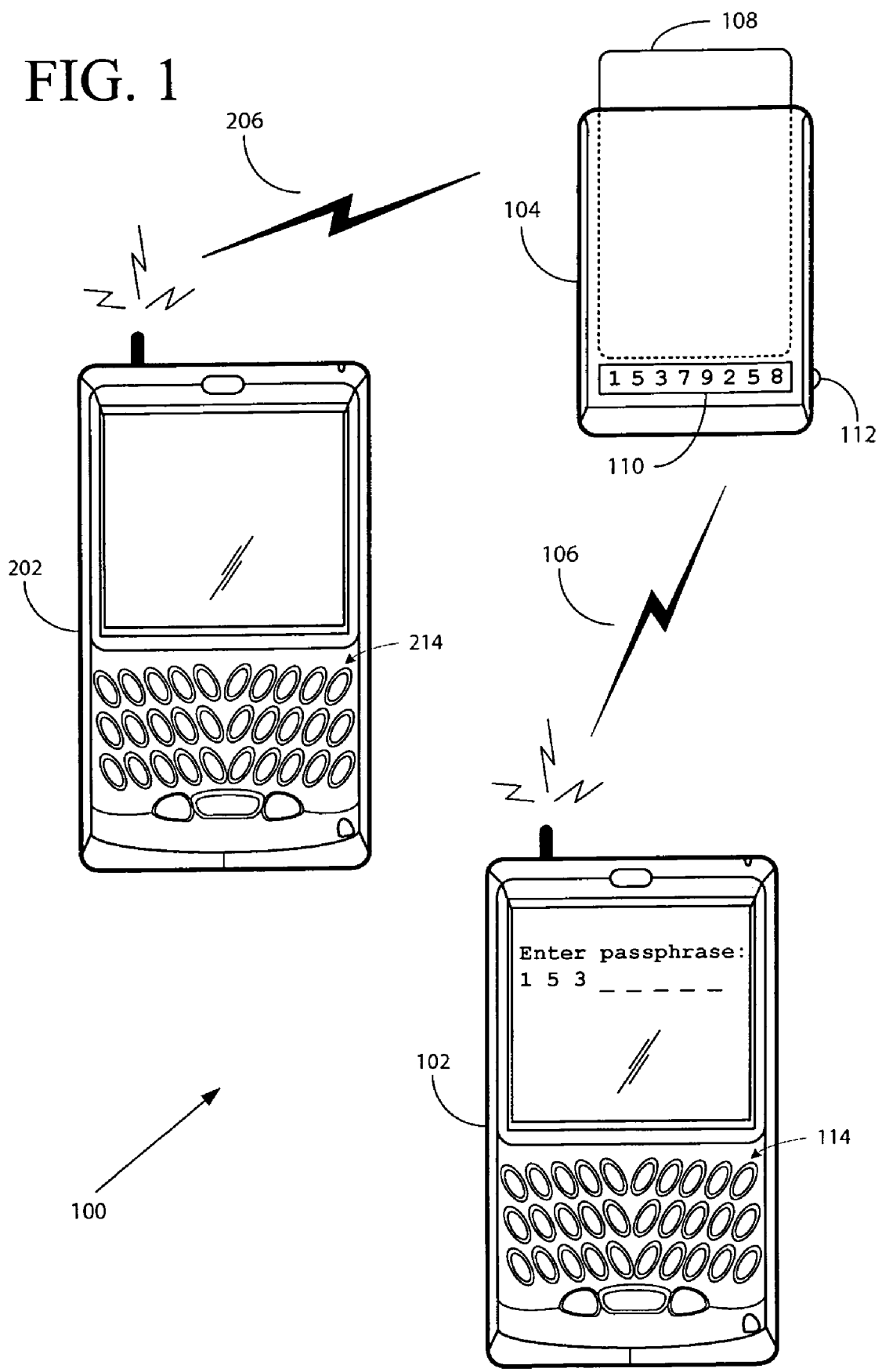
FIG. 1 is a schematic diagram of a wireless smart card system comprising a first and second mobile device, a smart card reader, and a smart card.

In the following detailed description, numerous specific details are set forth in order to provide a thorough understanding of various preferred embodiments. However, it will be understood by those of ordinary skill in the art that these embodiments may be practiced without these specific details. In other instances, well-known methods, procedures, components and circuits have not been described in detail, but will be understood by those skilled in the art.

In accordance with a preferred embodiment, there is provided a method for connecting a plurality of communication devices with a smart card reader configured to interface with a smart card for providing smart card sessions, comprising the steps of receiving a request at a smart card reader for a connection from a first communication device, the request comprising a first identifier for the first communication device; generating at the smart card reader a first security value for provision to the first communication device for establishing a secure pairing; establishing at the smart card reader first master connection key data for generating a first master connection key; generating at the smart card reader a first master connection key from the first master connection key data, wherein the first communication device is configured to generate the first master connection key from the first master connection key data, the first master connection key being used to secure data transmitted between the smart card reader and the first communication device, and wherein data transmitted to the first communication device comprises the first identifier; receiving a request at the smart card reader for a connection from a second communication device, the request comprising a first identifier for the second communication device; generating and transmitting from the smart card reader a second security value to the second communication device for establishing a secure pairing; establishing at the smart card reader second master connection key data for generating a second master connection key; generating at the smart card reader a second master connection key from the second master connection key data, wherein the second communication device is configured to generate the second master connection key from the second master connection key data, the second master connection key being used to secure data transmitted between the smart card reader and the second communication device and wherein data transmitted to the second communication device comprises the second identifier.

An embodiment further provides a smart card reader for providing a plurality of communication devices with smart card sessions, the smart card reader having a smart card reader identifier, comprising an interface for a smart card; a communications interface for wireless communication with a plurality of communication devices; a display; a memory configured to store a plurality of identifiers associated with the plurality of communication devices; a processor configured to generate security values, master connection key data, and master connection keys, wherein the smart card reader is adapted to receive requests for connections from a plurality of communication devices, the requests comprising at least one identifier for each of the plurality of communication devices, store the at least one identifier in the memory, generate for each of the plurality of communication devices a plurality of security values to establish a secure pairing with each of the plurality of communication devices, and store the plurality of security values in the memory, establish in respect of each of the plurality of communication devices master connection key data, and store the master connection key data in the memory; and generate a plurality of master connection keys from the master connection key data, such that each of the plurality of communication devices is associated with a different master connection key, and wherein the plurality of master connection keys is used to secure data transmitted between the smart card reader and the associated communication device in a smart card session.

Referring to FIG. 1, a schematic diagram of an exemplary system is provided, according to some embodiments of the invention. A system 100 includes a first mobile device 102 and a first wireless smart card reader 104. The mobile device 102 and smart card reader 104 are able to communicate over a wireless communication link 106. A non-exhaustive list of examples of wireless local area network standards for wireless communication link 106 includes the Institute of Electrical and Electronic Engineers (IEEE) for Wireless LAN MAC and Physical layer (PHY) 802.11a, b, g and n specifications or future related standards, the Bluetooth® standard, the Zigbee™ standard and the like.

A smart card 108 is shown inserted into smart card reader 104. Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with a secret key and with an authentication certificate, and may include a decryption engine, e.g., a processor and/or dedicated decryption logic. The smart card's functionality may be embedded in a device having a different form factor and being capable of communicating over an additional communication protocol, for example a Universal Serial Bus (USB) device.

A smart card may include a connector for powering the semiconductor device and performing serial communication with an external device. The smart card reader 104 may be provided in one of a number of form factors, including, but not limited to, a portable reader that can be worn on the person, for example by means of a lanyard (not shown) suspended around a user's neck. Alternatively, the reader 104 may be provided in a desktop reader form factor, or other form factor suitable for the smart card environment that will be apparent to the skilled reader.

The person whose security information is stored on smart card 108 may use smart card reader 104 for identification and to digitally sign and/or decrypt messages sent by device 102. For example, mobile device 102 may be able to send and receive e-mail messages via an e-mail server (not shown). The mobile device 102 may be configured to employ the Secure Multipurpose Internet Mail Extensions (S/MIME) protocol, such that e-mail messages received at the mobile device 102 are encrypted using a symmetric algorithm with a random session key generated by the sender of the e-mail message and encrypted by the recipient's (most likely the user of the mobile device 102) public key and sent with the message, and messages sent from the mobile device 102 are likewise encrypted with a random session key generated at the mobile device 102. Upon receipt of an encrypted e-mail message, mobile device 102 may extract the encrypted session key and send it to smart card reader 104 via the communication link 106. Smart card reader 104 may send the encrypted session key to smart card 108, and the decryption engine of smart card 108 may decrypt the encrypted session key using the recipient's private decryption key, which is stored in smart card 108. Smart card reader 104 may retrieve the decrypted session key from smart card 108 and forward it to mobile device 102 via communication link 106 so that mobile device 102 can decrypt the received e-mail message. The smart card 108 may prevent unauthorized use of the recipient's private decryption key by requiring that a password or personal identification number (PIN) be supplied before allowing the decryption operation to proceed.

Similarly, to add a digital signature to an e-mail message being sent by mobile device 102, mobile device 102 may send a hash of the contents of the e-mail message to smart card reader 104 over communication link 106. Smart card reader 104 may pass the hash to smart card 108, which may produce a digital signature from the hash and the sender's private signing key, which is stored in smart card 108. Smart card 108 may then pass the digital signature to smart card reader 104, which may forward it to mobile device 102 via communication link 106 so that mobile device 102 can transmit it along with the e-mail message to the e-mail server. Again, smart card 108 may prevent unauthorized use of the recipient's private signing key by requiring that a password or PIN be supplied before allowing the signing operation to proceed.

As those skilled in the art will appreciate, the mobile device 102 may be configured to provide other functions besides encryption that may require authentication by the smart card 108 via the smart card reader 104.

As shown in FIG. 1, the smart card reader 104 may be configured to communicate over a further wireless communication link 206 with a further mobile device 202. The further mobile device 202 may be configured to operate in a similar manner as the first mobile device 102; for example, it may be configured to employ the S/MIME protocol for encrypting and decrypting electronic messages, such as e-mail messages, in a manner similar to that described above. The further mobile device 202 may provide other functions that require authentication by the same smart card 108 in the same smart card reader 104, if both mobile devices 102, 202 are designated for use by the same smart card user. It is more likely, however, that the user of the smart card 108 and the smart card reader 104 will require the security functions of the smart card 108 for operating a mobile device 102 and another computing device 250, such as the personal computer shown in FIG. 2.

Figure 2:
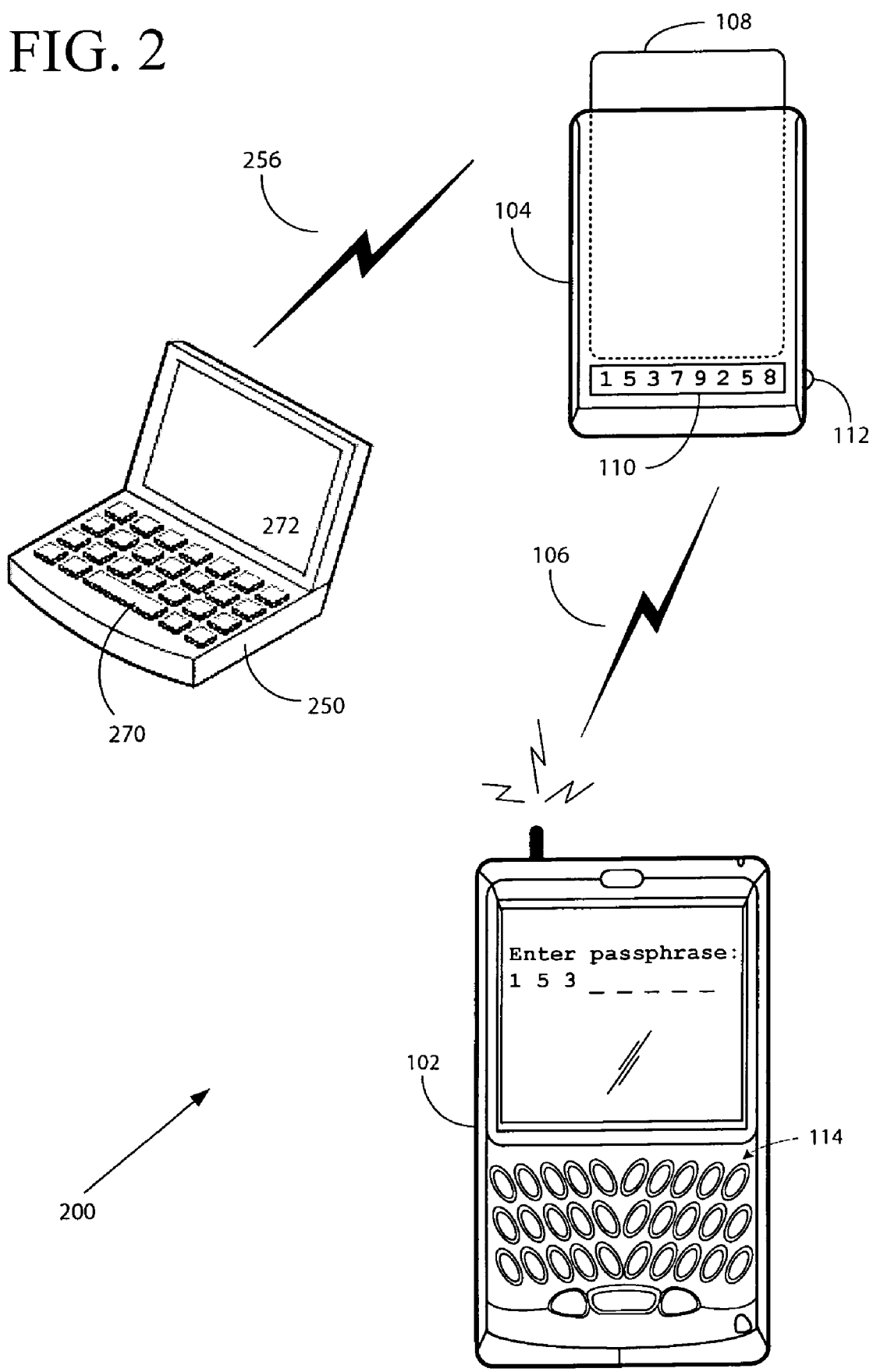
FIG. 2 is a schematic diagram of a wireless smart card system comprising two connecting devices, a smart card reader, and a smart card.

FIG. 2 shows a further exemplary system 200, comprising the mobile device 102, a personal computer 250, and the smart card reader 104 in communication with the smart card 108. In a manner similar to the system 10 of FIG. 1, the computer 250 and the smart card reader 104 are able to communicate over a wireless communication link 256. The user of the smart card 108 for authentication functions may use the smart card 108 and the smart card reader 104 for identification and to digitally sign and/or decrypt messages sent by the personal computer 250, in a manner similar to that described above in the context of the first mobile device 102 in FIG. 1. In addition, the smart card 108 and the smart card reader 104 may be used for other authentication purposes, for example for authenticating the smart card user during the login process for either the mobile device 102 or the personal computer 250.

As in the previously described exemplary system, the personal computer 250 may be able to send and receive e-mail messages via an e-mail server (not shown). The personal computer 250 may be configured to employ the S/MIME protocol, such that e-mail messages received at and send from the personal computer 250 are encrypted using a symmetric algorithm with an encrypted, random session key generated by the sender of the e-mail message. Upon receipt of an encrypted e-mail message, the personal computer 250 may extract the session key encrypted using the recipient's (most likely the personal computer user's) public key, and may send it to smart card reader 104 via communication link 256. Smart card reader 104 may send the encrypted session key to smart card 108, and the decryption engine of smart card 108 may decrypt the encrypted session key using the recipient's private decryption key, which is stored in smart card 108. Smart card reader 104 may retrieve the decrypted session key from smart card 108 and forward it to the personal computer 260 via communication link 256 so that the personal computer 250 can decrypt the received e-mail message.

Similarly, to add a digital signature to an e-mail message being sent by the personal computer 250, the personal computer 250 may send a hash of the contents of the e-mail message to smart card reader 104 over communication link 256. Smart card reader 104 may pass the hash to smart card 108, which may produce a digital signature from the hash and the sender's private signing key, which is stored in smart card 108. Smart card 108 may then pass the digital signature to smart card reader 104, which may forward it to the personal computer 250 via communication link 256 so that mobile device 102 can transmit it along with the e-mail message to the e-mail server. As those skilled in the art will appreciate, the personal computer 250 may be configured to provide other functions besides encryption, digital signing, decryption or verification, which may require authentication by the smart card 108 via the smart card reader 104.

In all of the foregoing examples, the smart card 108 may prevent unauthorized use of the smart card user's private decryption key by requiring that a password or personal identification number (PIN) be supplied before allowing the decryption operation to proceed. When the user of the smart card 108 and smart card reader 104 and of the mobile communication device 102, 202 or the personal computer 250 wishes to add a digital signature send an encrypted message to a remote recipient, in a similar manner the smart card 108 may prevent unauthorized use of the recipient's private signing key by requiring that a password or PIN be supplied before allowing the signing operation to proceed.

Figure 3:
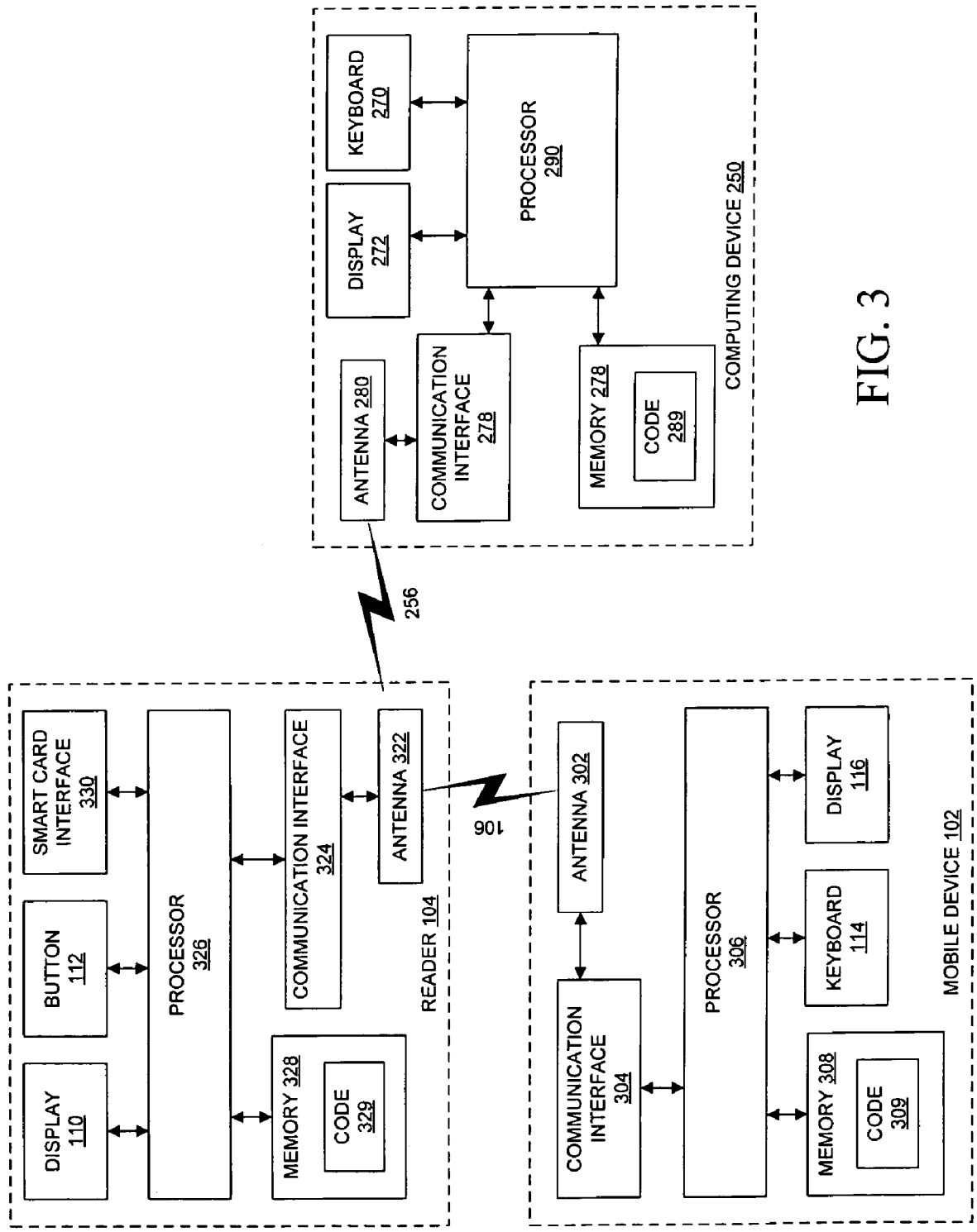
FIG. 3 is a block diagram of the connecting devices and smart card reader of FIG. 2.

A block diagram of the smart card reader 104, the mobile device 102, and a computing device 250 is provided in FIG. 3. In the preferred embodiment, the smart card reader 104, the mobile device 102, and the computing device 250 each comprises a two-way RF communication device having data communication capabilities and optionally voice communication capabilities. Preferably each of the mobile device 102 and the computing device 250 has the capability to communicate with other computer systems via a local or wide area network.

The smart card reader 104 preferably comprises a processor 326, configured to execute code 329 stored in a memory element 328. The processor 326 and memory element 328 may be provided on a single application-specific integrated circuit, or the processor 326 and the memory element 328 may be provided in separate integrated circuits or other circuits configured to provide functionality for executing program instructions and storing program instructions and other data, respectively. The processor is connected to a smart card interface 330. The memory 328 may comprise both volatile and non-volatile memory such as random access memory (RAM) and read-only memory (ROM); preferably sensitive information, such as keys and personal identification numbers (PINs), are stored in volatile memory.

The code 329 provided in the smart card reader 104 may include operating system software, password verification code, and specific applications, which may be stored in non-volatile memory. For example the code 329 may comprise drivers for the smart card reader 104 and code for managing the drivers and a protocol stack for communicating with the communications interface 324 which comprises a receiver and a transmitter (not shown) and is connected to an antenna 322.

The smart card reader 104 may also be configured to interface with the user via the input means 112, here provided as a button for manipulation by the user, and via the display 110, here a single-line readout for displaying strings of alphanumeric characters as shown in FIGS. 1 and 2. The communications interface 324 may also comprise other processing means, such as a digital signal processor and local oscillators. The smart card reader 104 may include a power supply (not shown), which in the case of a portable smart card reader is provided by at least one battery or power cell. Preferably the casing and the power supply of the smart card reader 104 is configured such that removal of the casing disconnects the power supply, thereby clearing the volatile memory of the reader 104. The smart card reader 104 may also be provided with a further output means, not shown, such as a light emitting diode (LED), which may be tri-coloured for indicating the status of the smart card reader 104.

The mobile device 102 comprises an input means, here shown as a keyboard 114, although alternative or additional input means, such as thumbwheels and buttons, may also be provided. The mobile device 102 also comprises an output means, such as a display 116; the mobile device 102 may also be provided with a speaker, not shown. The mobile device comprises an antenna 302 connected to a communication interface 304, which in turn communicates with a processor 306. The communication interface 304 may include similar components as the communication interface 324 of the smart card reader 104, such as a digital signal processor, local oscillator, a receiver, and a transmitter. The processor 306 accesses a memory element 308 which stores code 309, which may include operating system software and application-specific software, as well as drivers and protocol stacks for handling communication over one or more communication links, such as the wireless communication link 106. The memory element 308 may include both volatile and non-volatile memory. The memory element 308 and the processor 306 may be provided in a single application-specific integrated circuit, or may be provided as separate components. The processor 306 may execute a number of applications that control basic operations, such as data and voice communications via the communication interface 304, as well as a personal information manager that may be installed during manufacture and e-mail client for composing, editing, digitally signing and encrypting and digitally verifying and decrypting messages.

Similarly, a computing device 250 is provided with an input device such as a keyboard 270, and is provided with an output means such as a monitor 272. If the computing device 250 is capable of wireless communication with the smart card reader 104, then it will also comprise an antenna 280 in communication with a communications interface 278, which like the communications interfaces of the mobile device 102 and the smart card reader 104, may comprise a receiver, transmitter, digital signal processor, and local oscillators. The computing device 250 may comprise multiple data storage means, denoted in FIG. 3 by the memory element 284. The memory 284 may include RAM, ROM, and other storage media including a hard drive and removable digital storage media; the memory 284 stores code 289 that is executed by the processor 290. The code 289 may include operating system software, drivers for the communications interface 278, a protocol stack for communicating via the communications interface 278, a personal information manager and an e-mail client for composing, editing, digitally signing and encrypting and digitally verifying and decrypting messages. The personal information manager, e-mail client, and other data stores on the computing device 250 are preferably capable of being reconciled with similar data stores on the mobile device 102.

Figure 4:
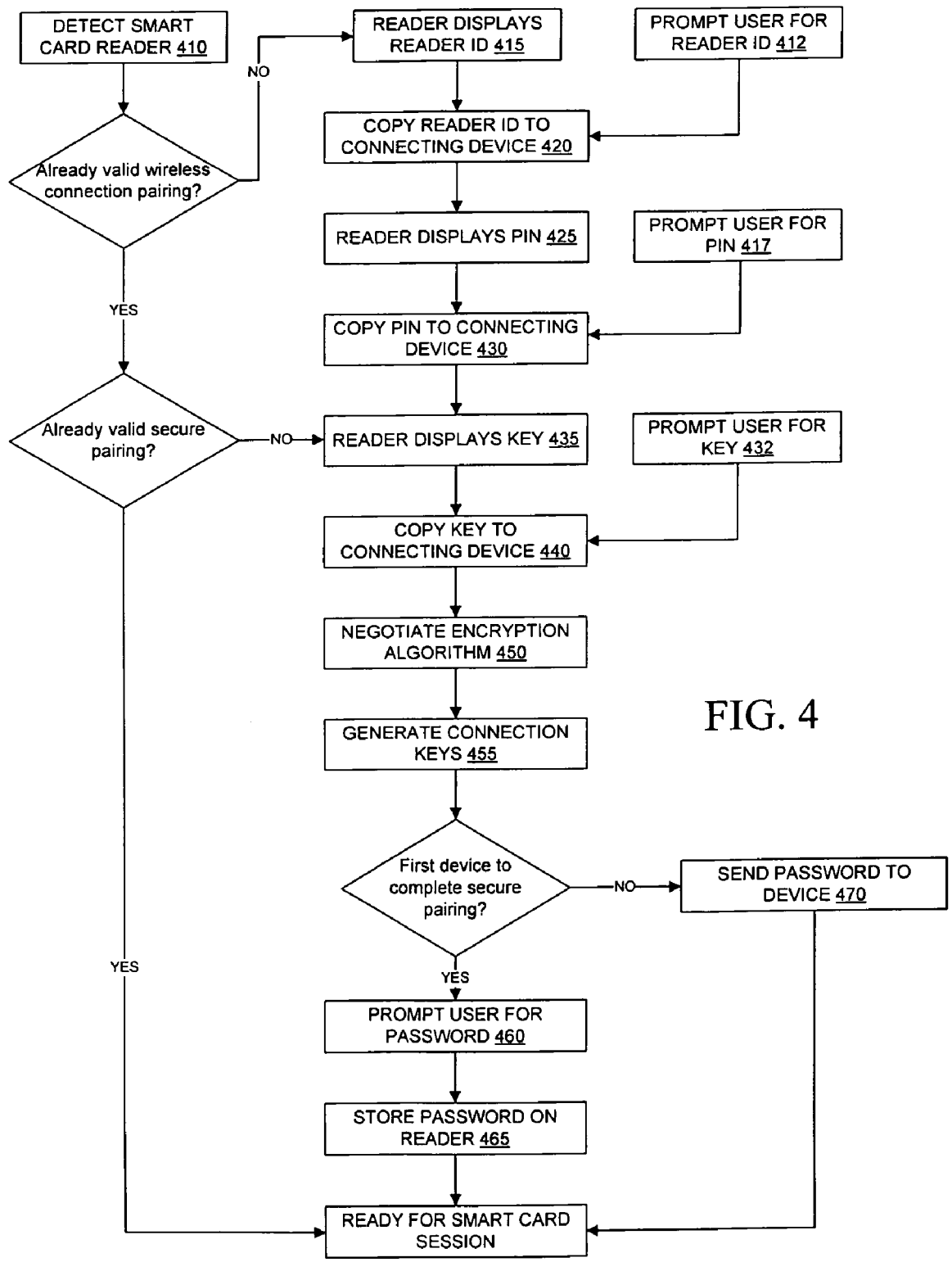
FIG. 4 is a schematic representation of a method for pairing a connecting device with a smart card reader.

The specific design and implementation of the communications interfaces of the smart card reader 104, the mobile device 102, and the computing device 260 are dependent upon the communication network in which the devices are intended to operate. In a preferred embodiment, the computing device 250 and the mobile device 102 each communicate with the smart card reader 104 via wireless communication links 256 and 106 respectively, for example in accordance with the Bluetooth® standard. Preferably, in order to ensure the security of the wireless communication links 106, 256, a system of pairing mechanisms is employed. An exemplary method by which a connection is made between a connecting device, such as a mobile device 102 or another computing device 256, and the smart card reader 104 is shown in FIG. 4.

When the connecting device 102 or 256 determines that smart card functionality is needed, the device 102 or 256 may attempt to detect the availability of a nearby smart card reader 104 at step 410. For example, when a smart card reader 104 provided with a smart card 108 is powered up or reset, preferably by pressing the button 112 when the reader 104 is in a power off state, or when a smart card 108 is inserted, the reader 104 may enter a discoverable mode in which it awaits a request for a connection from a device 102 or 250. The smart card reader 104 does not have to be in a discoverable mode in order to receive and process a request for a connection.

If this is the first time that the connecting device 102 or 250 has attempted to connect to the smart card reader 104 or no previous wireless connection pairing between the device 102 or 250 and the reader 104 currently exists, a wireless connection pairing step is carried out. Alternatively, policy settings may be configured so that the wireless connection pairing is forced upon certain events, such as removal and reinsertion of a smart card 108 in the reader 104, or a maximum number of password attempts on a connecting device while attempting to access the smart card 108, or other events that may be defined by those skilled in the art.

The smart card reader 104 displays an identifier or reader ID, which is a preferably unique value associated with the reader 104, in the display 110 at step 415. This reader ID may comprise the Media Access Control (MAC) address of the reader 104. The reader ID may be displayed in response to a user action, for example by pressing the button 112 on the smart card reader 104. The user is prompted at step 412 by the connecting device 102 or 250 to enter the reader ID via the input means 114 or 270 at step 420 for storage in memory 308 or 284. This step thus identifies to the connecting mobile or other computing device 102 or 250 which smart card reader 104 is to be used for security functions by the device 102 or 250. Once the reader ID is input on the device 102 or 250, a security value is exchanged between the smart card reader 104 and the connecting device 102 or 250. The smart card reader 104 is configured to display this security value, for example a PIN, at step 425; the PIN is read by the user and entered on the connecting device 102 or 250 at step 430, preferably in response to a prompt 417. The reader 104 may be configured to display the PIN once the button 112 is actuated, so for example, the connecting device 102 or 250 may be configured to prompt the user to press the button 112 on the reader 104 as well as to enter the new value displayed by the reader 104 at step 417. This completes the wireless connection pairing; the connecting device 102 or 250 thus stores the reader ID and the PIN provided by the smart card reader 104.

Further mobile devices 102 or computing devices 250 may be wireless connection paired at this stage in a similar manner. The reader ID displayed by the smart card reader 104 will be the same as the value previously displayed; the PIN, however, may be a different value than the PIN used during the pairing of a previous device 102 or 250. The PIN may be a random value generated by the code 329 resident on the smart card reader 104, seeded by one or more sources of entropy using techniques known in the art. Once the connecting device 102 or 250 has stored the PIN, it transmits a confirmation to the reader 104 and the reader 104 erases the PIN from the display 110.

Once the wireless connection pairing (or pairings) is (or are) established between one or more connecting devices 102 or 250 and the smart card reader 104, the devices and the reader are preferably paired with a further secure pairing. For each connecting device 102 or 250, the reader 104 is configured to display a secure pairing key on its display 110 at step 435, which is read by the user and entered on the connecting device 102 or 250 at step 440 for storage in memory 308 or 284. The secure pairing key preferably comprises a random value generated by the code 329 resident in the smart card reader 104. The reader 104 may be configured to display this secure pairing key once the button 112 on the reader 104 is actuated, and again, the connecting device 102 or 250 may be configured at step 432 to prompt the user to enter the secure pairing key, and if necessary to press the button 112 in order to display the secure pairing key. After the secure pairing is complete, the connecting device 102 or 250 may transmit confirmation that the key was received to the reader 104 and the reader 104 erases the secure pairing key from the display 110. The secure pairing key may be used by the connection device 102 or 250 and the smart card reader 104 to generate a further connection key for use in communications between the device 102 or 250 and the smart card reader 104.

Preferably, the secure pairing is initiated and completed before one of the following activities is attempted: importation of certificates stored on the smart card 108 into the connecting device 102 or 250; private key operations for signing a message to be sent from the connecting device 102 or 250 or decrypting a message received by the connecting device 102 or 250; launch of a configuration utility on the connecting device 102 or 250 for configuring reader-specific settings; a user-initiated device password change on the connecting device 102 or 250; any other attempt by the connecting device 102 or 250 to connect to the smart card reader 104. Other events and activities may trigger a secure pairing. If the connecting device 102 or 250 and the reader 104 have already entered into a secure pairing, then it is not necessary to re-initiate the secure pairing steps.

In addition, policy settings may be configured to wipe the secure pairing keys from the memory 308, 284 of the connecting device 102 or 250 respectively, or from the memory 328 of the smart card reader 104 upon certain events. If the secure pairing keys are wiped, then the connecting device 102 or 250 and the smart card reader 104 will initiate another secure pairing before the reader 104 accesses the smart card 108 on behalf of the connecting device 102 or 250.

Further mobile devices 102 or computing devices 250 may enter into a secure pairing at this stage in a similar manner. For each device requesting a secure pairing, the smart card reader 104 may generate a new secure pairing key for display in display 110. Preferably, the system 100 or 200 is configured such that upon pairing of subsequent devices 102, 250, the reader 104 pushes the device's identifier, its MAC address, and the time at which the pairing was made to all previously paired devices 102, 250.

Once the secure pairing is completed, the connecting device 102 or 250 and the reader 104 may negotiate any further communications protocols for the wireless communication link 106 or 256 at step 450. For example, once the wireless connection pairing and the secure pairing steps are complete, the connecting device 102 or 250 may request from the reader 104 a list of supported encryption protocols and algorithms; the reader 104 may create a list of supported protocols and algorithms and transmit it to the connecting device 102 or 250; and upon receipt of the list, the connecting device 102 or 250 selects an encryption algorithm supported by the connecting device, and transmits instructions to the reader 104 to use the selected algorithm for future processes requiring encryption during the lifetime of the current secure pairing. Preferably, the reader 104 and the connecting device 102 or 250 also establish master connection key data for creating a master connection key for deriving further connection keys for use in transmitting data at step 455, using techniques known in the art. Preferably the master connection key itself is not transmitted between the reader 104 and the connecting device 102 or 250; rather, the key establishment protocol is known to both the reader 104 and the connecting device 102 or 250, so that each reader and device may use the selected encryption algorithm to generate its own copy of the master connection key from master connection key data. The master connection key data may comprise the secure pairing key generated at step 435 and copied to the connecting device 102 or 250 at step 440. The master connection key data may comprise the secure pairing key along with a further seed value, generated by either the connection device 102 or 250 or the reader 104, and transmitted to the reader 104 or the connecting device 102 or 250 as a separate step. In one embodiment, the connecting device 102 or 250 may include the seed value, preferably a randomly-generated value at least 64 bytes long, with the instructions sent to the reader 104 along with the selected encryption algorithm. The master connection key may be used by both the reader 104 and the connecting device 102, 250 to derive a plurality of keys for use in the transport layer, for example keys for encrypting, decrypting, and authenticating messages transmitted between the reader 104 and the connecting device 102, 250. A new master connection key is preferably generated for each device 102 or 250 that pairs with the smart card reader 104; thus, each device 102 or 250 that is paired with the reader 104 will store a single master connection key, while the reader 104 will store one master connection key for each device that is validly paired with the reader 104. A second device 102, 250 that is paired with the reader 104 is therefore unable to decrypt messages passed between the reader 104 and a first device 102, 250, even though both devices may be paired with the reader 104 at the same time.

In addition to the encryption of messages between the reader 104 and the device 102 or 250, a further access control method is preferably implemented. Once a first device, for example the mobile device 102, completes the secure pairing step, the mobile device 102 then sets a connection password. The connection password may be set by the user in response to a prompt at step 460, and is transmitted to the reader 102 and stored in memory 328 at step 465. The connection password controls access to the reader 104 by requiring the password for all future connections. The same connection password may be used for all devices 102, 250 that are paired with the reader 102. Thus, once a secure pairing is accomplished, as shown in FIG. 4 if the reader 102 determines that the connecting device 102 or 250 is not the first device 102, 250 to be paired with the reader and a connection password already exists, the connection password is transmitted to the connecting device 102 or 250 for storage, and the connecting device 102 or 250 is configured to use this password to access the smart card reader 104. The user therefore is not required to memorize an additional password for each device paired with the smart card reader 104.

The password also prevents an attacker from being able to connect debugging tools to the smart card reader 104 to extract the master connection key. The password verification code provided in the smart card reader memory 328 may be executed to verify the connection password during future transactions. The connection password is preferably required to be entered by the user on the connecting device 102 or 250, and verified by the smart card reader 104, before certain functions are carried out, such as changing the connection password, altering the system configuration, or invoking smart card sessions for performing security-related functions such as encryption or decryption.

Preferably, policies are set to configure the smart card reader 104 to accept a limited number of attempts to enter the connection password in future transactions, and other policies to determine the minimum and maximum length of the connection password, the relative strength of the password, and other password security measures that are known in the art. One policy may include a single count of connection password attempts for all devices connected to a given smart card reader 104; for example, if a mobile device 102 and two other computing devices 250 are wireless connection paired with the smart card reader 104, and the password verification code on the smart card reader 104 is configured to allow a maximum of five connection password attempts, those five connection password attempts apply to all three devices paired with the smart card reader 104; if the user fails to enter the correct connection password on five consecutive attempts on one computing device 250, the user cannot turn to the mobile device 102 and make further attempts without the wireless connection and secure pairing information being wiped from the memory 328 of the smart card reader 104. In addition, if the connection password is changed by the user using one connecting device 250, preferably all other devices (in this example the other computing device 250 and the mobile device 102) are disconnected and will be challenged for the new connection password when they attempt to reconnect to the smart card reader 104.

Once the secure pairing step is complete and the connection password is established, the wireless communication link is secured between the device 102 or 250 and the smart card reader 104. The reader 104 is thus available for one or more smart card sessions with the one or more connecting devices 102 or 250 paired with the reader 104. It will be appreciated by those skilled in the art that an implementation of the method described above would preferably incorporate other steps; for example, the smart card reader 104 or the connecting device 102 or 250 may be configured to wait a maximum period of time for a next step in the method outlined in FIG. 4 to be executed. In the event of a timeout due to any cause, for example one of the devices moving out of range and causing the wireless link 106 or 256 to be dropped, the pairing process may be aborted and the reader display 110 may be cleared, or the PIN or secure pairing key stored by the connecting device 102 or 250 and by the reader 104 may be erased, with the result that the pairing process must be restarted.

The system also comprises connection-specific settings that relate to the connection between a device and the smart card reader 104. Thus, for example, there are connection-specific settings relevant to the smart card reader-computing device 250 connection, and connection-specific settings relevant to the smart card reader-mobile device 102 connection.

These connection-specific settings are managed separately for each connecting device 250, 102. A master copy of the connection-specific settings may be stored on the relevant device 250 or 102, and are sent to the reader 104 from the device 250 or 102 when a connection is made between the device 250 or 102 and the reader 104.

The connection-specific settings may include a reader ID, which identifies the last connected reader by its ID number; a connected indicator for indicating whether the relevant device is currently connected to the reader 104; and one or more timeout setting for determining when and if pairing information should be cleared from the smart card reader in respect of a connection. For example, an erase key timeout setting may be used to determine how long after a wireless connection is dropped that the corresponding pairing information is cleared. A long-term timeout setting may be used to determine how frequently the secure pairing information is cleared. Other timeout settings may be related to the removal of the smart card 108 from the smart card reader 104, the number of transactions provided by the smart card 108, or inactivity.

The reader-specific settings may include LED settings for correlating various LED output signals with the state of the smart card reader 104; for example, the LED settings may be configured such that flashing red denotes low battery status, flashing blue means that the smart card is transmitting or receiving data over the wireless communication link 106 or 206. The reader-specific settings may also include a communications range setting for specifying the power level of the radio on the smart card reader 104; a power saving mode for configuring radio functions to reduce power consumption; and a power-off timeout for setting the maximum period of time that the smart card reader 104 will remain on without a wireless connection with a mobile device 102 or a computing device 250. The reader-specific settings may also include a connection heartbeat period for testing whether a connection between the smart card reader 104 and a device 102 or 250 should be closed; for example, the mobile or other computing device 102, 250 may be configured to send a signal to the smart card reader 104 at a frequency determined by the connection heartbeat period setting, and the smart card reader 104 may be configured to acknowledge the signal. If this heartbeat is missed by either the smart card reader 104 or the device 102 or 250, then the wireless connection between the smart card reader 104 and the device 102 or 250 is dropped.

Additional policy settings may be provided in the smart card reader 104 operating system software and in the utilities provided on the mobile device 102 or other computing device 250. These policy settings may address the maximum number of devices that can be connected to the smart card reader 104, and other settings affecting the operation of the smart card system as a whole.

A transaction, or smart card session, comprises a set of instructions or data transmitted from a connecting device 102 or 250 to the smart card reader 104, or vice versa. In the preferred embodiment, only a single session may be open at a given time, and a session may be used by only a single connection. The session is typically substantially shorter than the lifetime of the secure or wireless connection pairing.

Preferably, when the connecting device 102 or 250 is configured to request security functions from a smart card 108, the device 102 or 250 is configured to construct a command which may comprise a number of data for transmission over the wireless link 106, 256, to the smart card reader 104. The device 102 or 250 may first construct and transmit a request for a smart card session; the request may comprise the reader ID or the MAC address of the reader 104; a device identifier, which may comprise a MAC address for the connecting device 102 or 250, or a device name previously provided to the reader 104 during the pairing process; and an instruction requesting a session. If the request is acknowledged by the reader 104, the device 102 or 250 may then construct and transmit one or more commands. Preferably, the command comprises the reader ID or the MAC address of the smart card reader 104; the payload, which may comprise an instruction to be carried out by the smart card reader 104, or other data; and the device identifier of the connecting device 102 or 250. Upon receipt of the command over the wireless link 106, 256, the reader 104 is therefore able to determine which device sent the command, and can format any acknowledgement or response with the MAC address or device name of the transmitting connecting device 102 or 250. Each command is preferably secured or signed using a key derived from the master connection key, which is preferably unique to each connecting device 102, 250; the reader 104 will decrypt or authenticate the command using the appropriate key derived from the master connection key stored in the smart card reader 104. The reader 104 may likewise encrypt or sign the commands or responses transmitted to the connecting device 102, 250 using keys derived from the master connection key, and the connecting device 102, 250 in turn may decrypt or authenticate the received messages using its stored master connection key and the keys derived therefrom.

During a single smart card session, a connecting device 102, 250 may transmit a number of commands to the smart card reader 104, and the smart card reader 104 may in turn transmit a number of responses or acknowledgements to the connecting device 102, 250. While it is unlikely that a second connecting device 102, 250 would need to transmit commands to the smart card reader 104 at the same time as a first device if the smart card reader and the paired devices 102, 250 are operated by a single user, the smart card reader 104 may be configured to handle simultaneous received commands. In the preferred embodiment, if the smart card reader 104 is engaged in a first smart card session with a first device 102 or 250 when another request for a second smart card session is received by the reader 104, the reader 104 caches the request in its memory 328; when the first smart card session is terminated, the reader 104 retrieves the cached request and transmits an acknowledgement to the second device 102 or 250, thus opening the smart card session with the second device. The second device 102 or 250 then proceeds by transmitting a command to the reader 104. In an alternative embodiment, the reader 104 ignores other requests for smart card sessions until the first smart card session is terminated. In either of these embodiments, the second device 102 or 250, while its request for a session is not immediately handled, continues to receive and transmit the heartbeat described above and may be configured to maintain its wireless and secure pairing so long as the heartbeat is received.

In a further embodiment, a further request for a smart card session is acknowledged by the smart card reader 104 during an existing smart card session, and the reader 104 interleaves the commands received, processed, and the responses transmitted from and to the separate connecting devices 102, 250. Alternatively, if the request for a smart card session includes an identifier of the nature of the transaction required, the reader 104 may prioritize the requested smart card sessions in accordance with a predetermined order of precedence. For example, requests for smart card functionality for a user to log into a device 102, 250 may be granted higher priority than a request for a user to digitally sign an outbound electronic mail message.

The system 100 or 200 comprises reader specific settings, which are shared among all devices. In the exemplary embodiment described here, the reader-specific settings are shared among the mobile device 102, the smart card reader 104, and the computing device 250. A master copy of the reader-specific settings is stored by the smart card reader 104 in the memory 328. Each of the mobile device 102 and the computing device 250 caches the last-known reader-specific settings. The reader-specific settings are preferably displayable by the mobile device 102 and the computing device 250, and may be configurable by the user via either the mobile device 102 or the computing device 250, for example by launching smart card reader configuration utility code stored on the device 102 or 250. Preferably reader-specific settings are configured in accordance with a set protocol to avoid conflicts; for example, if configuration utilities are running concurrently on both the mobile device 102 and the computing device 250, preferably the device that saves the reader-specific settings last "wins" and the most recently-saved reader-specific settings are propagated to the smart card reader 104 and to the other device 250 or 102 and saved. Preferably the reader-specific settings are not changeable on a device 102 or 250 unless there is a connection between the device 102 or 250 and the smart card reader 104.

Those skilled in the art will appreciate that other embodiments of the system described herein may include zero or more mobile devices 102, and zero or more other computing devices 250, and that the computing devices 250 described above may include any appropriate digital device for processing information, including mobile communication devices, personal digital assistants, tablet computers, desktop computers, and the like. In a preferred embodiment, the smart card reader 104 may be configured to allow a simultaneous connection to only one mobile device 102, but a plurality of other computing devices 250.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A method for connecting a plurality of communication devices with a smart card reader configured to interface with a smart card for providing smart card sessions, the method comprising:

receiving a request at the smart card reader for a connection from a first communication device, the request comprising a first identifier for the first communication device;

generating at the smart card reader a first security value for provision to the first communication device for establishing a secure pairing with the first communication device;

establishing at the smart card reader first master connection key data for generating a first master connection key;

generating at the smart card reader a first master connection key from the first master connection key data, wherein the first communication device is configured to generate the first master connection key from the first master connection key data, the first master connection key being used to secure data transmitted between the smart card reader and the first communication device, and wherein data transmitted to the first communication device comprises the first identifier;

receiving a request at the smart card reader for a connection from a second communication device, the request comprising a second identifier for the second communication device;

generating and transmitting from the smart card reader a second security value to the second communication device for establishing a secure pairing with the second communication device while the secure pairing with the first communication device is established; establishing at the smart card reader second master connection key data for generating a second master connection key; and generating at the smart card reader second master connection key from the second master connection key data, wherein the second communication device is configured to generate the second master connection key from the second master connection key data, the second master connection key being used to secure data transmitted between the smart card reader and the second communication device and wherein data transmitted to the second communication device comprises the second identifier.

2. The method of claim 1, further comprising:

after receiving the request at the smart card reader for the connection from the first communication device, transmitting connection pairing information to the first communication device for establishing a connection pairing with the first communication device; and after receiving the request at the smart card reader for the connection from the second communication device, transmitting the connection pairing information to the second communication device for establishing a connection pairing with the second communication device;

wherein the connection pairing information comprises an identifier for the smart card reader.

3. The method of claim 1, further comprising:

after receiving the request at the smart card reader for the connection from the first communication device, determining whether a connection pairing exists between the first communication device and the smart card reader, and if not, transmitting connection pairing information to the first communication device for establishing a connection pairing; and after receiving the request at the smart card reader for the connection from the second communication device, determining whether a connection pairing exists between the second communication device and the smart card reader, and if not, transmitting the connection pairing information to the second communication device for establishing a connection pairing;

wherein the connection pairing information comprises an identifier for the smart card reader.

4. The method of claim 1, wherein the request at a smart card reader for a connection from a first or a second communication device comprises a request for a smart card session.

5. The method of claim 4, further comprising the steps of:

when the request for a connection from the second communication device is received, determining whether the smart card reader is currently providing a first smart card session to the first communication device;

if the smart card reader is currently providing a first smart card session, caching the request for a connection from the second communication device; and when the first smart card session is terminated, providing a second smart card session to the second communication device.

6. The method of claim 4, further comprising:
when the request for the connection from the first communication device is received, determining whether the smart card reader is currently providing a first smart card session to the second communication device;
if the smart card reader is currently providing a first smart card session, caching the request for the connection from the first communication device; and
when the first smart card session is terminated, providing a second smart card session to the first communication device.

7. The method of claim 4, wherein a smart card session comprises a series of transmissions, the method further comprising:
when the request for the connection from the second communication device is received, determining whether the smart card reader is currently providing a first smart card session to the first communication device;
if the smart card reader is currently providing a first smart card session, providing a second smart card session to the second communication device,
wherein providing the second smart card session to the second communication device comprises interleaving the series of transmissions associated with the second smart card session with the series of transmissions associated with the first smart card session.

8. The method of claim 4, wherein a smart card session comprises a series of transmissions, the method further comprising:
when the request for the connection from the first communication device is received, determining whether the smart card reader is currently providing a first smart card session to thesecond communication device;
if the smart card reader is currently providing a first smart card session, providing a second smart card session to the first communication device,
wherein providing the second smart card session to the first communication device comprises interleaving the series of transmissions associated with the second smart card session with the series of transmissions associated with the first smart card session.

9. The method of claim 1, wherein generating at the smart card reader the first security value for provision to the first communication device for establishing the secure pairing with the first communication device further comprises:
displaying the first security value on the smart card reader for entry at the first communication device; and
receiving acknowledgement that the first communication device has received the first security value.

10. The method of claim 9, wherein generating at the smart card reader the first master connection key from the first master connection key data comprises:
deriving, at the first communication device, the first master connection key from the first master connection key data, wherein the first master connection key data comprises the first security value associated with the first communication device; and
deriving, at the smart card reader, the first master connection key from the first master connection key data, wherein the first master connection key data comprises the first security value associated with the first communication device;
such that the first master connection key derived at each of the first communication device and the smart card reader are identical.

11. The method of claim 10, wherein the first master connection key is used to secure data transmitted to and from the first communication device, and wherein generating at the smart card reader the first master connection key from the first master connection key data comprises generating at least one encryption key from the first master connection key for encrypting data for transmission between the smart card reader and the first communication device.

12. The method of claim 9, wherein generating at the smart card reader the second security value for provision to the second communication device for establishing the secure pairing with the second communication device further comprises:
displaying the second security value on the smart card reader for entry at the second communication device; and
receiving acknowledgement that the second communication device has received the second security value.

13. The method of claim 12, wherein generating at the smart card reader the first master connection key from the first master connection key data comprises:
deriving, at the first communication device, the first master connection key from the first master connection key data, wherein the first master connection key data comprises the first security value associated with the first communication device; and
deriving, at the smart card reader, the first master connection key from the first master connection key data, wherein the first master connection key data comprises the first security value associated with the first communication device;
such that the first master connection key derived at each of the first communication device and the smart card reader are identical;
and wherein generating at the smart card reader the second master connection key from the second master connection key data comprises:
deriving, at the second communication device, the second master connection key from the second master connection key data, wherein the second master connection key data comprises the second security value associated with the second communication device; and
deriving, at the smart card reader, the second master connection key from the second master connection key data, wherein the second master connection key data comprises the second security value associated with the second communication device;
such that the second master connection key derived at each of the second communication device and the smart card reader are identical.

14. The method of claim 13, wherein the first master connection key is used to secure data transmitted to and from the first communication device, and wherein generating at the smart card reader the first master connection key from the first master connection key data comprises generating at least one encryption key from the first master connection key for encrypting data for transmission between the smart card reader and the first communication device,
and wherein the second master connection key is used to secure data transmitted to and from the second communication device, and wherein generating at the smart card reader the second master connection key from the second master connection key data comprises generating at least one encryption key from the second master connection key for encrypting data for transmission between the smart card reader and the second communication device.

15. The method of claim 1, wherein the first and second communication devices and the smart card reader each comprise a wireless communication interface for communicating between the first and second communication devices and the smart card reader.

16. The method of claim 15 wherein the wireless connection interface is a Bluetooth connection interface.

17. The method of claim 15 wherein at least one of the communication devices is a mobile communication device.

18. The method of claim 1, further comprising, after generating at the smart card reader the first master connection key, receiving at the smart card reader a connection password established at the first communication device for controlling access to the smart card reader and storing the connection password at the smart card reader; and after generating at the smart card reader the second master connection key, transmitting the connection password to the second communication device, such that the connection password controls access to the smart card reader for both the first and second communication devices.

19. The method of claim 1, further comprising, after generating at the smart card reader the second master connection key, receiving, at the smart card reader, a set of reader-specific settings relating to the smart card reader configured at one of the first or second communication de ices;

storing the received set of reader-specific settings at the smart card reader; and transmitting the received set of reader-specific settings to the other of the first or second communication devices.

20. The method of claim 1, further comprising, after generating at the smart card reader the second master connection key, transmitting, by the smart card reader, the second identifier to the first communication device.

21. A smart card reader for providing a plurality of communication devices with smart card sessions, the smart card reader having a smart card reader identifier, comprising:

an interface for a smart card;
a communications interface for wireless communication with a plurality of communication devices;
a display;
a memory configured to store a plurality of identifiers, each one of the plurality of identifiers being associated with a distinct one of the plurality of communication devices;
a processor configured to generate security values, master connection key data, and master connection keys,
wherein the smart card reader is adapted to:
receive requests for connections from a plurality of communication devices, each requests comprising an identifier for a corresponding one of the plurality of communication devices;
store the identifier comprised in each request in the memory;
generate for each of the plurality of communication devices a corresponding security values for establishing a secure pairing therewith, and store each of the corresponding security values in the memory;
establish in respect of each of the plurality of communication devices corresponding master connection key data, and store each of the corresponding master connection key data in the memory;
generate a corresponding master connection keys from each of the corresponding master connection key data, such that each of the plurality of communication devices is associated with a different corresponding master connection key, and wherein each corresponding master connection keys is used to secure data transmitted between the smart card reader and the associated communication device in a smart card session.

22. The smart card reader of claim 21, wherein the smart card reader is further adapted to transmit connection pairing information to each of the plurality of communication devices for establishing a connection pairing with each of the plurality of communication devices, wherein the connection pairing information transmitted to each of the plurality of communication devices comprises the smart card reader identifier.

23. The smart card reader of claim 21, wherein the requests for connections comprise each comprise a requests for a smart card session.

24. The smart card reader of claim 23, wherein the smart card reader is further adapted to:

determine, upon receipt of a request for connection from one of the plurality of communication devices, whether the smart card reader is currently providing a first smart card session to another of the plurality of communication devices;

cache the request for connection if the smart card reader is currently providing a first smart card session; and provide a second smart card session in response to the cached request for connection when the first smart card session is terminated.

25. The smart card reader of claim 23, wherein a smart card session comprises a series of transmissions, and the smart card reader is further adapted to:

determine, upon receipt of a request for connection from one of the plurality of communication devices, whether the smart card reader is currently providing a first smart card session to another of the plurality of communication devices;

if the smart card reader is currently providing a first smart card session, provide a second smart card session to the second communication device by interleaving the series of transmissions associated with the second smart card session with the series of transmissions associated with the first smart card session.

26. The smart card reader of claim 21, wherein the smart card reader is further adapted to generate at least one encryption key from each of the corresponding master connection keys.

27. A system for providing a plurality of communication devices with smart card sessions, comprising:

the smart card reader of claim 21; and
at least one communication device comprising a wireless communication interface for communicating with the smart card reader.

28. The system of claim 27, wherein the wireless connection interface is a Bluetooth connection interface.

29. The system of claim 27, wherein the at least one communication device is a mobile communication device.

30. The smart card reader of claim 21, wherein the communications interface is a Bluetooth connection interface.

31. A communications device comprising the smart card reader of claim 21.

32. A mobile communications device comprising the smart card reader of claim 21.

33. The smart card reader of claim 21, wherein the memory is further configured to store a connection password for controlling access to the smart card reader, wherein the connection password is established at a first of the plurality of communication devices with which the smart card reader is securely paired, and wherein the smart card reader is further configured to transmit the stored connection password to another of the plurality of communication devices with which the smart card reader is securely paired, such that the connection password controls access to the smart card reader for all of the plurality of communication devices.

34. The smart card reader of claim 21, wherein the memory is further configured to store reader-specific settings relating to the smart card reader, and wherein the smart card reader is further adapted to receive changes to the reader-specific settings from a first of the plurality of communication devices with which the smart card reader is securely paired and to transmit said changes to another of the plurality of communication devices with which the smart card reader is securely paired.

35. The smart card reader of claim 21, wherein the smart card reader is further adapted, after a secure pairing is established with one of the plurality of communication devices, to transmit the identifier corresponding with said one of the plurality of communication devices to each of the plurality of communication devices already securely paired with the smart card reader.

36. A computer-readable medium comprising code executable by a computing device for:
receiving a request at the smart card reader for a connection from a first communication device, the request comprising a first identifier for the first communication device;
generating at the smart card reader a first security value for provision to the first communication device for a secure pairing with the first communication device;
establishing at the smart card reader first master connection key data for generating a first master connection key;
generating at the smart card reader a first master connection key from the first master connection key data,
wherein the first communication device is configured to generate the first master connection key from the first master connection key data, the first master connection key being used to secure data transmitted between the smart card reader and the first communication device, and wherein data transmitted to the first communication device comprises the first identifier;
receiving a request at the smart card reader for a connection from a second communication device, the request comprising a second identifier for the second communication device;
generating and transmitting from the smart card reader a second security value to the second communication device for establishing a secure pairing with the second communication device while the secure pairing with the first communication device is established;
establishing at the smart card reader second master connection key data for generating a second master connection key; and
generating at the smart card reader a second master connection key from the second master connection key data,
wherein the second communication device is configured to generate the second master connection key from the second master connection key data, the second master connection key being used to secure data transmitted between the smart card reader and the second communication device and wherein data transmitted to the second communication device comprises the second identifier.

* * * * *

UNITED STATES PATENT AND TRADEMARK OFFICE
CERTIFICATE OF CORRECTION

PATENT NO. : 7,464,865 B2  Page 1 of 1
APPLICATION NO. : 11/412759
DATED : December 16, 2008
INVENTOR(S) : Michael K. Brown, Neil P. Adams and Herbert A. Little It is certified that error appears in the above-identified patent and that said Letters Patent is hereby corrected as shown below:

Column 14, line 12, after "established;" insert a return and indent ("establishing at the smart card...." should begin on a new line);
Column 14, line 15, after "smart card reader", add --a--;

Column 17, line 29, delete "de ices" and insert --devices--;
Column 17, line 52, delete "requests" and insert --request--;
Column 17, line 58, delete "values" and insert --value--;
Column 17, line 65, delete "keys" and insert --key--;

Column 18, line 3, delete "keys" and insert --key--;
Column 18, line 15, delete the first occurrence of "comprise";
Column 18, line 15, delete "requests" and insert "request"; and Column 19, line 29, after "for" insert --establishing--.

Signed and Sealed this

Seventeenth Day of February, 2009

JOHN DOLL
*Acting Director of the United States Patent and Trademark Office*